United States Patent
Zhou et al.

(10) Patent No.: US 12,530,560 B2
(45) Date of Patent: Jan. 20, 2026

(54) SYSTEM AND METHOD FOR DIFFERENTIAL ARCHITECTURE SEARCH FOR NEURAL NETWORKS

(71) Applicant: Salesforce, Inc., San Francisco, CA (US)

(72) Inventors: Pan Zhou, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 975 days.

(21) Appl. No.: 17/072,485

(22) Filed: Oct. 16, 2020

(65) Prior Publication Data

US 2021/0383188 A1    Dec. 9, 2021

Related U.S. Application Data

(60) Provisional application No. 63/034,269, filed on Jun. 3, 2020.

(51) Int. Cl.
*G06N 3/04* (2023.01)
*G06N 3/08* (2023.01)

(52) U.S. Cl.
CPC .................. *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| | | | |
|---|---|---|---|
| 10,282,663 B2 | 5/2019 | Socher et al. |
| 10,346,721 B2 | 7/2019 | Albright et al. |
| 10,474,709 B2 | 11/2019 | Paulus |
| 10,521,465 B2 | 12/2019 | Paulus |
| 10,542,270 B2 | 1/2020 | Zhou et al. |
| 10,546,217 B2 | 1/2020 | Albright et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,318 B2 | 2/2020 | Bradbury |
| 10,565,493 B2 | 2/2020 | Merity et al. |
| 10,573,295 B2 | 2/2020 | Zhou et al. |
| 10,592,767 B2 | 3/2020 | Trott et al. |
| 10,699,060 B2 | 6/2020 | Mccann |

(Continued)

OTHER PUBLICATIONS

Louizos et al., "Learning Sparse Neural Networks Through L0 Regularization," Jun. 22, 2018, pp. 1-39. (Year: 2018).*

(Continued)

*Primary Examiner* — Kyle R Stork
(74) *Attorney, Agent, or Firm* — Haynes and Boone, LLP

(57) ABSTRACT

A method for generating a neural network, including initializing the neural network including a plurality of cells, each cell corresponding to a graph including one or more nodes, each node corresponding to a latent representation of a dataset. A plurality of gates are generated, wherein each gate independently determines whether an operation between two nodes is used. A first regularization is performed using the plurality of gates. The first regularization is one of a group-structured sparsity regularization and a path-depth-wised regularization. An optimization is performed on the neural network by adjusting its network parameters and gate parameters based on the regularization of the sparsity.

17 Claims, 8 Drawing Sheets

(56) References Cited

U.S. PATENT DOCUMENTS

| | | | |
|---|---|---|---|
| 10,747,761 | B2 | 8/2020 | Zhong et al. |
| 10,776,581 | B2 | 9/2020 | Mccann et al. |
| 10,783,875 | B2 | 9/2020 | Hosseini-Asl et al. |
| 10,817,650 | B2 | 10/2020 | Mccann et al. |
| 10,839,284 | B2 | 11/2020 | Hashimoto et al. |
| 10,846,478 | B2 | 11/2020 | Lu et al. |
| 10,902,289 | B2 | 1/2021 | Gao et al. |
| 10,909,157 | B2 | 2/2021 | Paulus et al. |
| 10,929,607 | B2 | 2/2021 | Zhong et al. |
| 10,958,925 | B2 | 3/2021 | Zhou et al. |
| 10,963,652 | B2 | 3/2021 | Hashimoto et al. |
| 10,963,782 | B2 | 3/2021 | Xiong et al. |
| 10,970,486 | B2 | 4/2021 | Machado et al. |
| 11,663,481 | B2* | 5/2023 | Liu .......... G06N 3/04 706/25 |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher et al. |
| 2018/0096219 | A1 | 4/2018 | Socher |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0268287 | A1 | 9/2018 | Johansen et al. |
| 2018/0268298 | A1 | 9/2018 | Johansen et al. |
| 2018/0336453 | A1 | 11/2018 | Merity et al. |
| 2018/0373987 | A1 | 12/2018 | Zhang et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0188568 | A1 | 6/2019 | Keskar et al. |
| 2019/0213482 | A1 | 7/2019 | Socher et al. |
| 2019/0251431 | A1 | 8/2019 | Keskar et al. |
| 2019/0258939 | A1 | 8/2019 | Min et al. |
| 2019/0286073 | A1 | 9/2019 | Asl et al. |
| 2019/0355270 | A1 | 11/2019 | Mccann et al. |
| 2019/0362246 | A1 | 11/2019 | Lin et al. |
| 2020/0005765 | A1 | 1/2020 | Zhou et al. |
| 2020/0065651 | A1 | 2/2020 | Merity et al. |
| 2020/0090033 | A1 | 3/2020 | Ramachandran et al. |
| 2020/0090034 | A1 | 3/2020 | Ramachandran et al. |
| 2020/0103911 | A1 | 4/2020 | Ma et al. |
| 2020/0104643 | A1 | 4/2020 | Hu et al. |
| 2020/0104699 | A1 | 4/2020 | Zhou et al. |
| 2020/0105272 | A1 | 4/2020 | Wu et al. |
| 2020/0117854 | A1 | 4/2020 | Lu et al. |
| 2020/0117861 | A1 | 4/2020 | Bradbury |
| 2020/0142917 | A1 | 5/2020 | Paulus |
| 2020/0175305 | A1 | 6/2020 | Trott et al. |
| 2020/0234113 | A1 | 7/2020 | Liu |
| 2020/0272940 | A1 | 8/2020 | Sun et al. |
| 2020/0285704 | A1 | 9/2020 | Rajani et al. |
| 2020/0285705 | A1 | 9/2020 | Zheng et al. |
| 2020/0285706 | A1 | 9/2020 | Singh et al. |
| 2020/0285993 | A1 | 9/2020 | Liu et al. |
| 2020/0302178 | A1 | 9/2020 | Gao et al. |
| 2020/0330026 | A1* | 10/2020 | Zhu .......... A61B 8/5207 |
| 2020/0334334 | A1 | 10/2020 | Keskar et al. |
| 2020/0364299 | A1 | 11/2020 | Niu et al. |
| 2020/0364542 | A1 | 11/2020 | Sun |
| 2020/0364580 | A1 | 11/2020 | Shang et al. |
| 2020/0372116 | A1 | 11/2020 | Gao et al. |
| 2020/0372319 | A1 | 11/2020 | Sun et al. |
| 2020/0372339 | A1 | 11/2020 | Che et al. |
| 2020/0372341 | A1 | 11/2020 | Asai et al. |
| 2020/0372632 | A1* | 11/2020 | Chauhan .......... A61B 3/0025 |
| 2020/0380213 | A1 | 12/2020 | Mccann et al. |
| 2021/0042604 | A1 | 2/2021 | Hashimoto et al. |
| 2021/0049236 | A1 | 2/2021 | Nguyen et al. |
| 2021/0073459 | A1 | 3/2021 | Mccann et al. |
| 2021/0089588 | A1 | 3/2021 | Le et al. |
| 2021/0089882 | A1 | 3/2021 | Sun et al. |
| 2021/0089883 | A1 | 3/2021 | Li et al. |

OTHER PUBLICATIONS

Zhou et al., "Theory-Inspired Path-Regularized Differential Network Architecture Search," 2020, pp. 1-12 (Year: 2020).*

Chu et al., "Fair DARTS: Eliminating Unfair Advantages in Differentiable Architecture Search," arXiv preprint arXiv: 1911.12126, 2019, pp. 1-36. Provided by applicant on May 3, 2021 (Year: 2019).*

Yu et al. "Exploiting sparseness in deep neural networks for large vocabulary speech recognition," 2012, 2012 IEEE International Conference on Acoustics, Speech and Signal Processing (ICASSP), pp. 4409-4412. (Year: 2012).*

Alessandro, Rinaldo, "Advanced statistics theory I," UC Berkeley Lecture, Available Online at <http://www.stat.cmu.edu/~arinaldo/Teaching/36755/F17/Scribed_Lectures/F17_0911.pdf>, Lecture 3: Sep. 11, 2017, 5 pages.

Allen-Zhu et al., "A convergence theory for deep learning via over-parameterization," In Proc. Int'l Conf. Machine Learning, Jun. 17, 2019, 53 pages.

Balduzzi et al., "The shattered gradients problem: If resnets are the answer, then what is the question?," In Proceedings of the 34th International Conference on Machine Learning, Sydney, Australia, PMLR 70, 2017, pp. 342-350.

Cai et al., "Path-level network transformation for efficient architecture search," In Proceedings of the 35th International Conference on Machine Learning, Stockholm, Sweden, PMLR 80, 2018, 12 pages.

Cai et al., "Proxylessnas: Direct neural architecture search on target task and hardware," In Int'l Conf. Learning Representations, 2018, 13 pages.

Chen et al., "Progressive Differentiable Architecture Search: Bridging the Depth Gap between Search and Evaluation," In IEEE International Conference on Computer Vision, 2019, 10 pages.

Chu et al., "Fair DARTS: Eliminating unfair advantages in differentiable architecture search," arXiv preprint arXiv:1911.12126, 2019, 36 pages.

DeVries et al., "Improved regularization of convolutional neural networks with cutout," arXiv preprint arXiv:1708.04552, 2017, 8 pages.

Dong et al., "Searching for A Robust Neural Architecture in Four GPU Hours," In Proc. IEEE Conf. Computer Vision and Pattern Recognition, 2019, pp. 1761-1770.

Du et al., "Gradient Descent Finds Global Minima of Deep Neural Networks," In Proceedings of the 36th International Conference on Machine Learning, Long Beach, California, PMLR 97, 2019, 45 pages.

Du et al., "Gradient descent provably optimizes over-parameterized neural networks," In Int'l Conf. Learning Representations, 2018, 19 pages.

Dyson, "Statistical theory of the energy levels of complex systems I," Journal of Mathematical Physics, vol. 3, No. 1, 1962, pp. 140-156.

He et al., "Deep Residual Learning for Image Recognition," In Proc. IEEE Conf. Computer Vision and Pattern Recognition, 2016, 12 pages.

He et al., "Identity Mappings in Deep Residual Networks," In Proc. European Conf. Computer Vision, 2016, pp. 630-645.

Howard et al., "MobileNets: Efficient Convolutional Neural Networks for Mobile Vision Applications," arXiv preprint arXiv:1704.04861, Apr. 17, 2017, 9 pages.

Huang et al., "Densely Connected Convolutional Networks," In Proc. IEEE Conf. Computer Vision and Pattern Recognition, 2017, 9 pages.

Hwang, "Cauchy's interlace theorem for eigenvalues of hermitian matrices," The American Mathematical Monthly, vol. 111, No. 2, Feb. 2004, pp. 157-159.

Kingma et al., "ADAM: A method for stochastic optimization," Int'l Conf Learning Representations, 2015, 15 pages.

(56) References Cited

OTHER PUBLICATIONS

Krizhevsky et al., "Learning multiple layers of features from tiny images," Apr. 8, 2009, 63 pages.
Liang et al., "DARTS+: Improved differentiable architecture search with early stopping," arXiv preprint arXiv:1909.06035, 2019, 15 pages.
Liu et al., "DARTS: Differentiable architecture search," In Int'l Conf. Learning Representations, 2018, 13 pages.
Liu et al., "Progressive Neural Architecture Search," In Proc. European Conf. Computer Vision, 2018, 16 pages.
Loshchilov et al., "SGDR: Stochastic gradient descent with warm restarts," arXiv preprint arXiv:1608.03983, In Int'l Conf. Learning Representations, 2017, 16 pages.
Louizos, et al., "Learning sparse neural networks through L0 regularization," In Int'l Conf. Learning Representations, 2018, 13 pages.
Ma et al., "ShuffleNet V2: Practical Guidelines for Efficient CNN Architecture Design," In Proc. European Conf. Computer Vision, 2018, pp. 116-131.
Maddison et al., "A* sampling," In Proc. Conf. Neural Information Processing Systems, 2014, 19, pages.
Orhan et al., "Skip connections eliminate singularities," In Int'l Conf. Learning Representations 2018, arXiv preprint arXiv:1701.09175, 2018, 22 pages.
Pham et al., "Efficient neural architecture search via parameter sharing," In Proc. Int'l Conf. Machine Learning, 2018, 11 pages.
Real et al., "Regularized evolution for image classifier architecture search," In AAAI Conference on Artificial Intelligence, vol. 33, 2019, pp. 4780-4789.
Russakovsky et al., "ImageNet Large Scale Visual Recognition Challenge," Int' l. J. Computer Vision, vol. 115, No. 3, 2015, 43 pages.
Saw et al., "Chebyshev Inequality with Estimated Mean and Variance," The American Statistician, vol. 38, No. 2, 1984, pp. 130-132.
Shu et al., "Understanding architectures learnt by cell-based neural architecture search," In Int'l Conf. Learning Representations, 2020, 21 pages.
Srivastava et al., "Dropout: a simple way to prevent neural networks from overfitting," J. of Machine Learning Research, vol. 15, No. 1, 2014, pp. 1929-1958.
Tan et al., "Mnasnet: Platform-aware neural architecture search for mobile," In Proc. IEEE Conf. Computer Vision and Pattern Recognition, 2019, pp. 2820-2828.
Tian, "An analytical formula of population gradient for two-layered relu network and its applications in convergence and critical point analysis," In Proc. Int'l Conf Machine Learning, 2017, pp. 3404-3413.
Wu et al., "FBnet: Hardware-aware efficient convnet design via differentiable neural architecture search," In Proc. IEEE Conf. Computer Vision and Pattern Recognition, 2019, pp. 10734-10742.
Xie et al., "SNAS: stochastic neural architecture search," In Int'l Conf. Learning Representations, 2019, arXiv:1812.09926v3, 2019, 17 pages.
Xu et al., "PC-DARTS: Partial channel connections for memory-efficient architecture search," In Int'l Conf Learning Representations, 2019, 13 pages.
Zela et al., "Understanding and robustifying differentiable architecture search," In Int'l Conf. Learning Representations, 2020, 28 pages.
Zhou et al., "Bayesnas: A bayesian approach for neural architecture search," In Proc. Int'l Conf. Machine Learning, 2019, 25 pages.
Zoph et al., "Learning transferable architectures for scalable image recognition," In Proc. IEEE Conf. Computer Vision and Pattern Recognition, 2018, 14, pages.
Zoph et al., "Neural architecture search with reinforcement learning," In Int'l Conf. Learning Representations, 2017, 16 pages.

* cited by examiner

SYSTEM AND METHOD FOR DIFFERENTIAL ARCHITECTURE SEARCH FOR NEURAL NETWORKS

This application claims priority to U.S. Provisional Patent Application No. 63/034,269 filed Jun. 3, 2020, which is incorporated by reference herein in its entirety.

TECHNICAL FIELD

The present disclosure relates generally to neural networks and more specifically to differential architecture search (DARTS) for selecting neural network architectures.

BACKGROUND

Network architecture search (NAS) is used for automating neural network architecture design, with many applications including image recognition and language modeling. For example, NAS may be used to automatically search for a directed graph and its edges from a huge search space. Compared with expert-designed architectures which require substantial efforts from experts by trial and error, NAS alleviates the design efforts and possible design bias brought by experts which could prohibit achieving better performance.

However, many approaches of NAS, e.g., differential NAS, typically select many skip connections which dominate over other types of operations in the network graph. Consequently, the searched networks may have unsatisfactory performance.

Accordingly, it would be advantageous to develop systems and methods for improved differential architecture search for neural networks.

In the figures, elements having the same designations have the same or similar functions.

DETAILED DESCRIPTION

Figure 1:
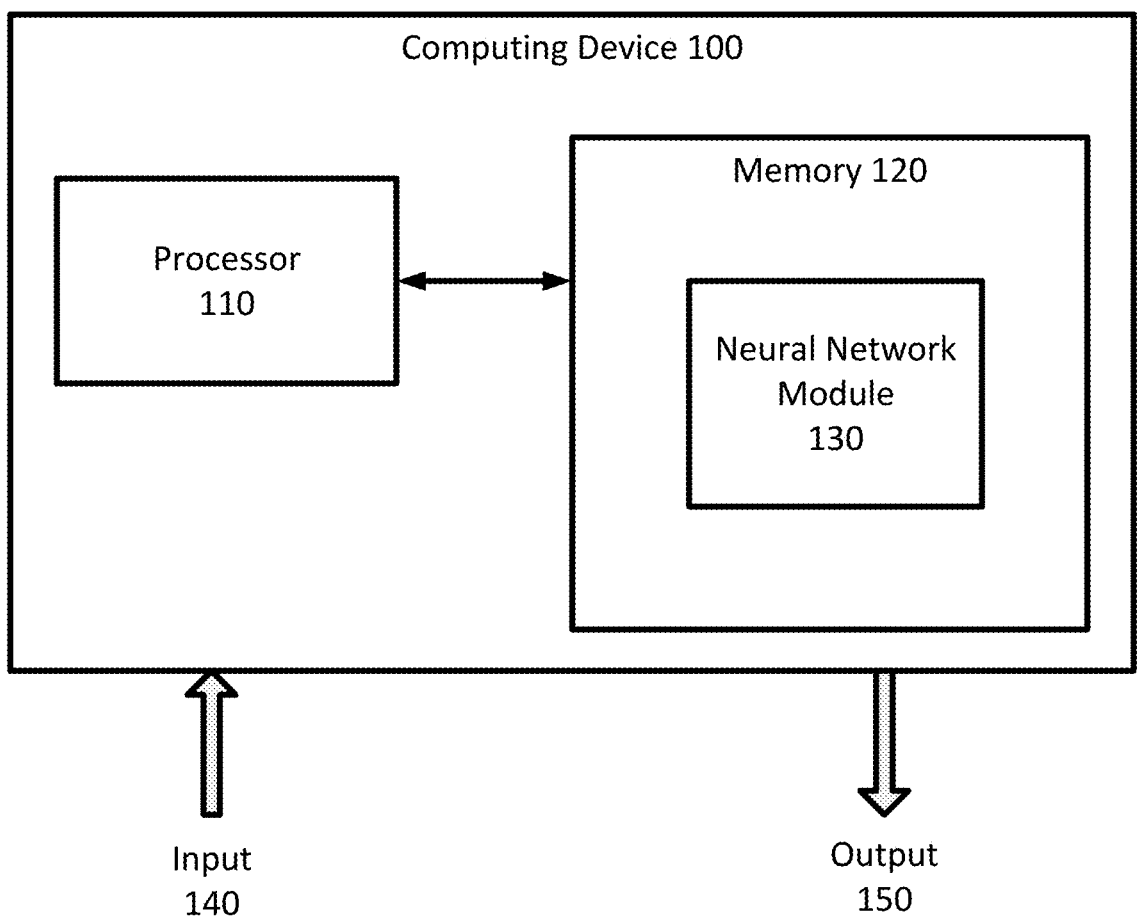
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. In some examples, neural network module 130 may be used to translate structured text. In some examples, neural network module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, neural network module 130 may be implemented using hardware, software, and/or a combination of hardware and software. As shown, computing device 100 receives input 140, which is provided to neural network module 130, neural network module 130 then generates output 150.

As discussed above, differential NAS approaches, e.g., differential architecture search (DARTS), typically select many skip connections which dominate over other types of operations in the network graph, and consequently, the searched networks may have unsatisfactory performance. Theoretical understandings on this issue are lacking, hindering developing more advanced architecture search methods in a principle way.

Formulation and Analysis Results for DARTS

To address the lack of theoretical understanding, theoretical analysis of the effects of various types of operations, e.g. convolution, skip connection and zero operation, to the network optimization is described below. It is found that architecture candidates with more skip connections converge faster than the candidates with more other type of operations, and thus are selected by DARTS. This finding theoretically and explicitly reveals the benefits of skip connections to fast network optimization and its competitive advantage over other type operations in DARTS.

DARTS searches cells which are used to stack the full network architecture. A cell is organized as a directed acyclic graph with h nodes $\{X^{(l)}\}_{l=0}^{h-1}$. Typically, the graph contains two input nodes $X^{(0)}$ and $X^{(1)}$ respectively defined as the outputs of two previous cells, and has one output node $X^{(h-1)}$ giving by concatenating all intermediate nodes $X^{(l)}$. Each intermediate node $X^{(l)}$ connects with all previous nodes $X^{(a)}$ ($0 \leq s < l$) via a continuous operation-weighting strategy, namely $$X^{(l)} = \sum_{0 \leq a < l} \sum_{t=1}^{r} \alpha_{x,t}^{(l)} O_t(X^{(a)}) \text{ with } \alpha_{x,t}^{(l)} = \exp(\beta_{x,t}^{(l)}) / \sum_{t=1}^{r} (\beta_{x,t}^{(l)})$$

where the operation $O_t$ comes from the operation set $\mathcal{O} = \{O_t\}_{t=1}^{r}$, including zero operation, skip connection, convolution, etc. In this way, the architecture search problem becomes efficiently learning continuous architecture parameter $\beta = \{\beta_{x,t}^{(l)}\}_{l,s,t}$ via optimizing the following bi-level model $$\min_\beta F_{val}(W^*(\beta), \beta), s.t. W^*(\beta) = \arg\min_W F_{train}(W, \beta),$$

where $F_{train}$ and $F_{val}$ respectively denote the loss on the training and validation datasets, W is the network parameters in the graph, e.g. convolution parameters. Then DARTS optimizes the architecture parameter $\beta$ and the network parameter W by alternating gradient descent. After learning $\beta$, DARTS prunes the dense graph according to the weight $\alpha_{x,t}^{(l)}$ in Eqn. (1) to obtain compact cells.

Despite its much higher search efficiency over RL and EA based methods, DARTS typically selects a cell with dominated skip connections, leading to unsatisfactory performance. But there is no rigorously theoretical analysis that explicitly justifies why DARTS tends to favor skip connections. The following section attempts to solve this issue by analyzing the convergence behaviors of DARTS.

For analysis, the cell structures in DARTS are detailed. Let input be $X \in \mathbb{R}^{\bar{m} \times \bar{p}}$ where $\bar{m}$ and $\bar{p}$ are respectively the channel number and dimension of input. Typically, one needs to resize the input to a target size m×p via a convolution layer with parameter $W^{(0)} \in \mathbb{R}^{m \times k_c \bar{m}}$ (kernel size $k_c \times k_c$)

$$X^{(0)} = \text{conv}(W^{(0)}, X) \in \mathbb{R}^{m \times p} \text{ with } \text{conv}(W; X) = \tau \sigma(W \Phi(X)),$$

and then feed it into the subsequent layers. The convolution operation conv performs convolution and then nonlinear mapping via activation function $\sigma$. The scaling factor $\tau$ equals to $$\frac{1}{\sqrt{m}}$$

when channel number in conv is $\bar{m}$. It is introduced to simplify the notations in our analysis and does not affect convergence behaviors of DARTS. For notation simplicity, assume that stride $s_c = 1$ and padding zero $$p_c = \frac{k_c - 1}{2}$$

to make the same sizes of output and input. Given a matrix $Z \in \mathbb{R}^{m \times p}$, $\Phi(Z)$ is defined as $$\Phi(Z) = \begin{bmatrix} Z_{1,-p_c+1:p_c+1}^T & Z_{1,-p_c+2:p_c+2}^T & \cdots & Z_{1,p-p_c:p+p_c}^T \\ Z_{2,-p_c+1:p_c+1}^T & Z_{2,-p_c+2:p_c+2}^T & \cdots & Z_{2,p-p_c:p+p_c}^T \\ \vdots & \vdots & \ddots & \vdots \\ Z_{m,-p_c+1:p_c+1}^T & Z_{m,-p_c+2:p_c+2}^T & \cdots & Z_{m,p-p_c:p+p_c}^T \end{bmatrix} \in \mathbb{R}^{k_c m \times p}$$

where $Z_{i,t} = 0$ ($t \leq 0$ or $t > p$).

Then the conventional convolution can be computed as $W\Phi(X)$ where each row in W denotes a conventional kernel. The subsequent layers in the cell:

$$X^{(l)} = \sum_{s=0}^{l-1} (\alpha_{s,1}^{(l)} \text{zero}(X) + \alpha_{s,2}^{(l)} \text{skip}(X) + \alpha_{s,3}^{(l)} \text{conv}(W_s^{(l)}; X^{(s)})) \in \mathbb{R}^{m \times p} (l=1, \ldots, h-1),$$

where zero operation zero(X)=0 and skip connection skip(X)=X, $\alpha_{s,t}^{(l)}$ is given in (1). In some embodiments, three representative operations (e.g., zero, skip connection and convolution) are considered, and other operations are ignored (e.g., pooling operation is ignored since it reveals the same behaviors as convolution, namely both being dominated by skip connections). Next, concatenation of all intermediate nodes is fed into a linear layer to obtain the prediction $u_i$ of the i-th sample $X_i$ and then obtain a mean squared loss:

$$F(W, \beta) = \frac{1}{2n} \sum_{i=1}^{n} (u_i - y_i)^2 \text{ with } u_i = \sum_{s=0}^{h-1} \langle W_s, X_i^{(s)} \rangle \in \mathbb{R},$$

where $X_i^{(s)}$ denotes the s-th feature node for sample $X_i$, $\{W_s\}_{s=0}^{h-1}$ denote the parameters for the linear layer. F(W, $\beta$) becomes $F_{train}(W, \beta)$ ($F_{val}(W, \beta)$) when samples come from training dataset (validation dataset). Subsequently, the effects of various types of operations to the convergence behaviors of $F_{train}(W, \beta)$ when optimize the network parameter W via gradient descent are analyzed as follows:

$$W_s^{(l)}(k+1) = W_s^{(l)}(k) - \eta \nabla_{W_s^{(l)}(k)} F_{train}(W, \beta)(\forall l, s),$$

$$W_s(k+1) = W_s(k) - \eta \nabla_{W_s^{(l)}(k)} F_{train}(W, \beta)(\forall, s),$$

where $\eta$ is the learning rate. In some embodiments, gradient descent is used instead of stochastic gradient descent, since gradient descent is expectation version of stochastic one and can reveal similar convergence behaviors. For analysis, mild assumptions widely used in network analysis is introduced.

Assumption 1. Assume the activation function $\sigma$ is $\mu$-Lipschitz and $\rho$-smooth. That is for $\forall x_1, x_2$, $\sigma$ satisfies $|\sigma(x_1) - \sigma(x_2)| \leq \mu |x_1 - x_2|$ and $|\sigma'(x_1) - \sigma'(x_2)| \leq \rho |x_1 - x_2|$. Moreover, assume that $\sigma(0)$ cn be upper bounded, and $\sigma$ is analytic and is not a polynomial function.

Assumption 2. Assume the initialization of the convolution parameters ($W_s^{(l)}$) and the linear mapping parameters ($W_s$) are drawn from Gaussian distribution $\mathcal{N}(0, I)$.

Assumption 3. Suppose the samples are normalized such that $\|X_i\|_F = 1$. Moreover, they are not parallel, namely vec $(X_i) \notin \text{span}(\text{vec}(X_j))$ for all $i \neq j$, where vec($X_i$) vectorizes $X_i$.

Assumption 1 is mild, since most differential activation functions, e.g. softplus and sigmoid, satisfy it. The Gaussian assumption on initial parameters in Assumption 2 is used in practice. While Gaussian variance is one for notation simplicity in analysis, the technique is applicable to any constant variance. The normalization and non-parallel conditions in Assumption 3 are satisfied in practice, as normalization is a data preprocess and samples in a dataset are often not restrictively parallel.

Theorem 1. Suppose Assumptions 1, 2, and 3 hold. Let $c=(1+\alpha_2+2\alpha_3\mu\sqrt{k_c c_{w0}})^h$, $\alpha_2=\max_{s,l}\alpha_{s,2}^{(l)}$ and $\alpha_3=\max_{s,l}\alpha_{s,3}^{(l)}$. If $$m \geq \frac{c_m \mu^2}{\lambda^2}[\rho p^2 \log(n/\delta) + c^2 k_c^2 c_{w0}^2/n] \text{ and } \eta \leq \frac{c_\eta \lambda}{\sqrt{m}\mu^4 h^3 k_c^2 c^4},$$

where $c_{w0}$, $c_m$, $c_\eta$ are constants, $\lambda$ is given below. Then when fixing architecture parameterize $\alpha$ in (1) and optimizing network parameter W via gradient descent (6), with probability at least $1-\delta$, we have $$F_{train}(W(k+1),\beta) \leq (1-\eta\lambda/4)F_{train}(W(k),\beta)(\forall k \geq 1),$$

where $$\lambda = \frac{3\sigma_o}{4}\lambda_{min}(K)\sum_{s=0}^{h-2}(\alpha_{s,3}^{(h-1)})^2 \prod_{t=0}^{s-1}(\alpha_{t,2}^{(s)})^2,$$

the positive constant $c_\sigma$ only depends on $\sigma$ and input data, $\lambda_{min}(K)=\min_{i,j}\Delta_{min}(K_{ij})$ is larger than zero in which $\Delta_{min}(K_{ij})$ is the smallest eigenvalue of $K_{ij}=[X_i^T X_j, X_i^T X_j; X_j^T X_j]$.

No new matter is added by these amendments.

Theorem 1 shows that for an architecture-fixed over-parameterized network, when using gradient descent to optimize the network parameter W, one can expect the convergence of the algorithm which is consistent with prior deep learning optimization work. More importantly, the convergence rate at each iteration depends on the network architectures which is parameterized by $\alpha$.

Specifically, for each factor $\lambda_s=(\alpha_{s,3}^{(h-1)})^2\Pi_{t=0}^{s-1}(\alpha_{t,2}^{(s)})^2$ in the factor $\lambda$, it is induced by the connection path $X^{(0)} \to X^{(1)} \to \ldots \to X^{(s)} \to X^{(h-1)}$. By observing $\lambda_s$, one can find that (1) for the connections before node $X^{(s)}$, it depends on the weights $\alpha_{t,2}^{(s)}$ of skip connections heavier than convolution and weight $\alpha_{s,3}^{(h)}$ heavier than the weights of other type operations. For observation (1), it can be intuitively understood: skip connection often provides larger gradient flow than the parallel convolution and zero connection and thus greatly benefits faster convergence of networks, since skip connection maintains primary information flow, while convolution only learns the residual information and zero operation does not delivery any information. So convolution and zero operations have negligible contribution to information flow and thus their weights do not occur in $\Pi_{t=0}^{s-1}(\alpha_{t,2}^{(s)})^2$ of $\lambda_s$. For observation (2), as the path $X^{(0)} \to X^{(1)} \to \ldots \to X^{(s)}$ is shared for all subsequent layers, it prefers skip connection more to maintain information flow, while for the private connection between $X^{(s)}$ and $X^{(h-1)}$ which is not shared since $X^{(h-1)}$ is the last node, it relies on learnable convolution more heavily than non-parameterized operations, since learnable operations have parameter to learn and can reduce the loss. For theoretical reasons for observations (1) and (2), the skip connection in the shared path can improve the singularity of network Gram matrix more than other types of operations, where the singularity directly determines the convergence rate, while the learnable convolution in private path can benefit the Gram matrix singularity much more. The weight $\alpha_{s,3}^{(l)}$ of zero operation does not occur in $\lambda$, as it does not delivery any information.

The description below analyzes why the selected cell has dominated skip connections. The above analysis shows that the convergence rate when optimizing $F_{train}(W, \beta)$ depends on the weights of skip connections heavier than other weights in the shared connection path which dominates the connections of a cell. So larger weights of skip connections often give faster loss decay of $F_{train}(W, \beta)$. Consider the samples for training and validation come from the same distribution which means $\mathbb{E}[F_{train}(W, \beta)]=\mathbb{E}[F_{val}(W, \beta)]$, larger weights of skip connections can also faster reduce $F_{val}(W)$ in expectation. So when optimizing a via optimizing $\beta$ in $F_{val}(W, \beta)$, DARTS will tune weights of most skip connections larger to faster reduce $F_{val}(W, \beta)$. As the weights of three operations on one edge share a softmax distribution in (1), increasing one operation weight means reducing other operation weights. Thus, skip connections gradually dominate over other types of operations for most connections in the cell. So when pruning operations according to their weights, most of skip connections are preserved while most of other operations are pruned. This explains the dominated skip connections in the cell selected by DARTS.

Improved DARTS Based on the Analysis Results

Figure 2:
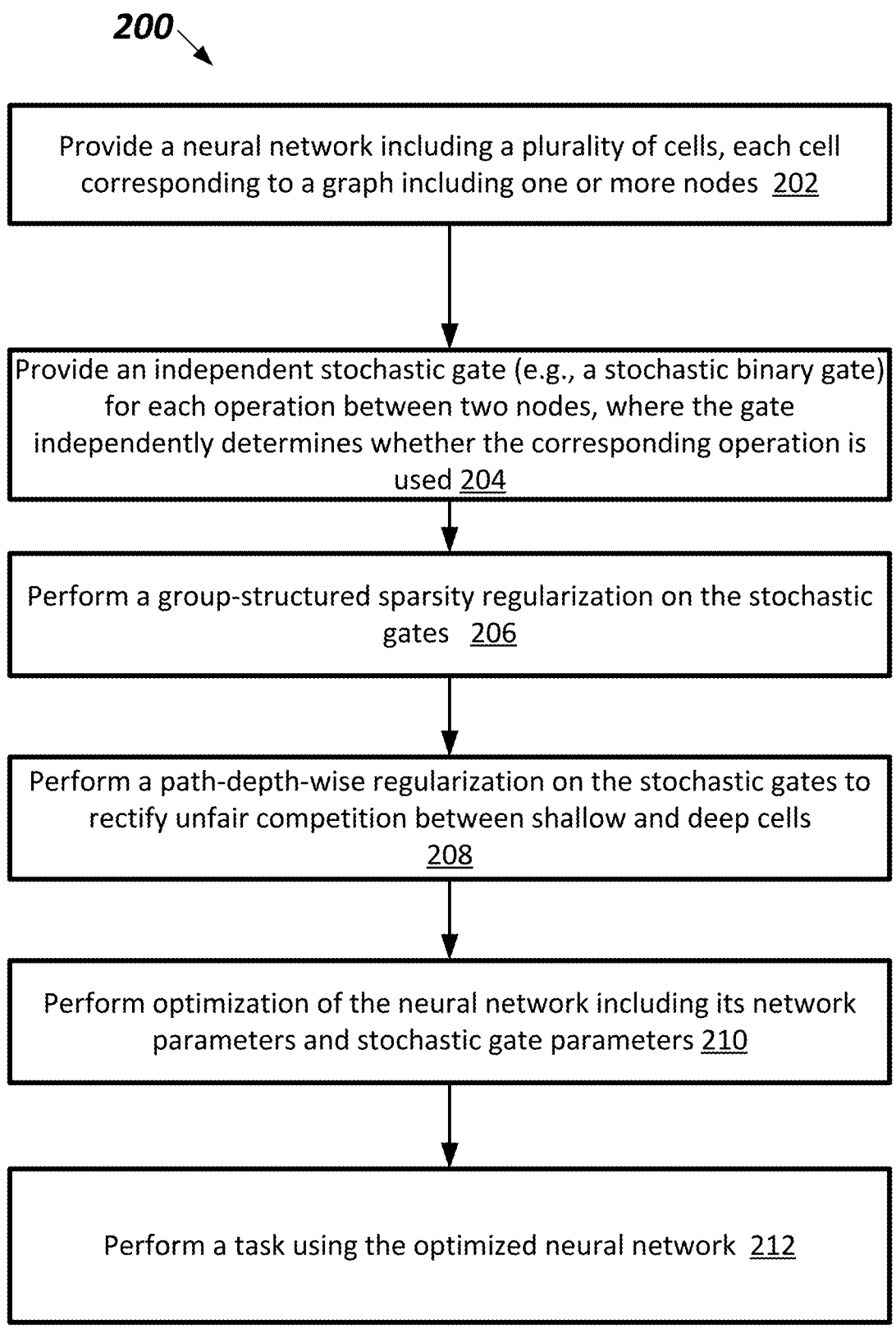
FIG. 2 is a simplified diagram of a method of performing improved differential architecture search for neural networks according to some embodiments.
Figure 3:
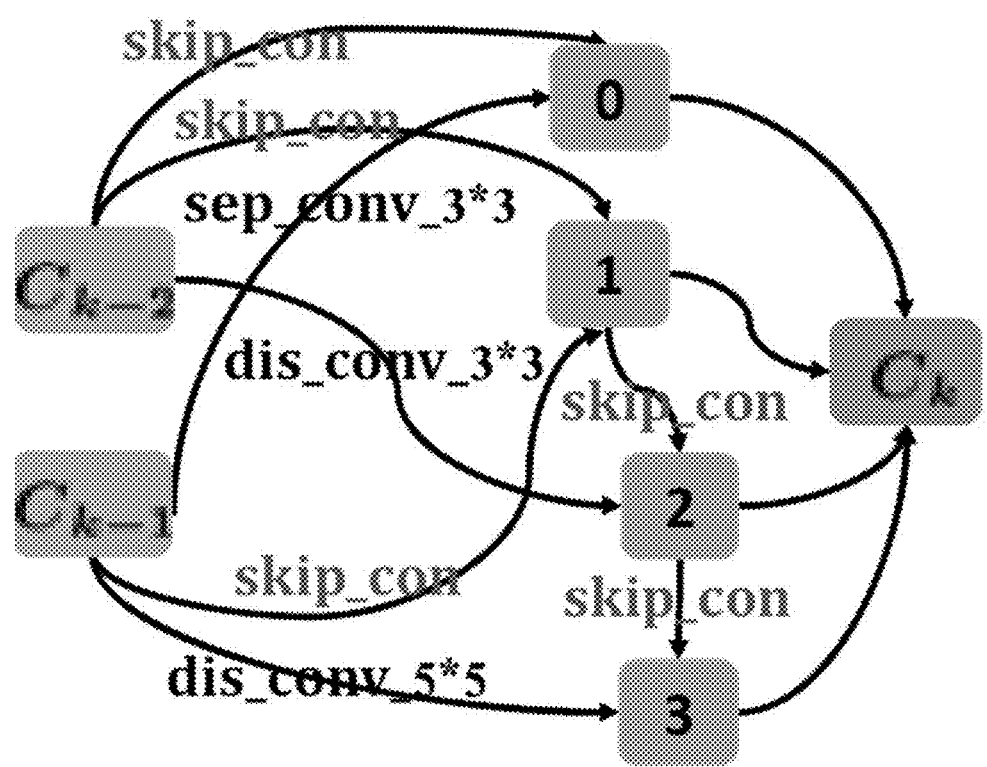
FIG. 3 is a diagram illustrating selected cells of a neural network using non-path-regularized DARTS according to some embodiments.
Figure 4:
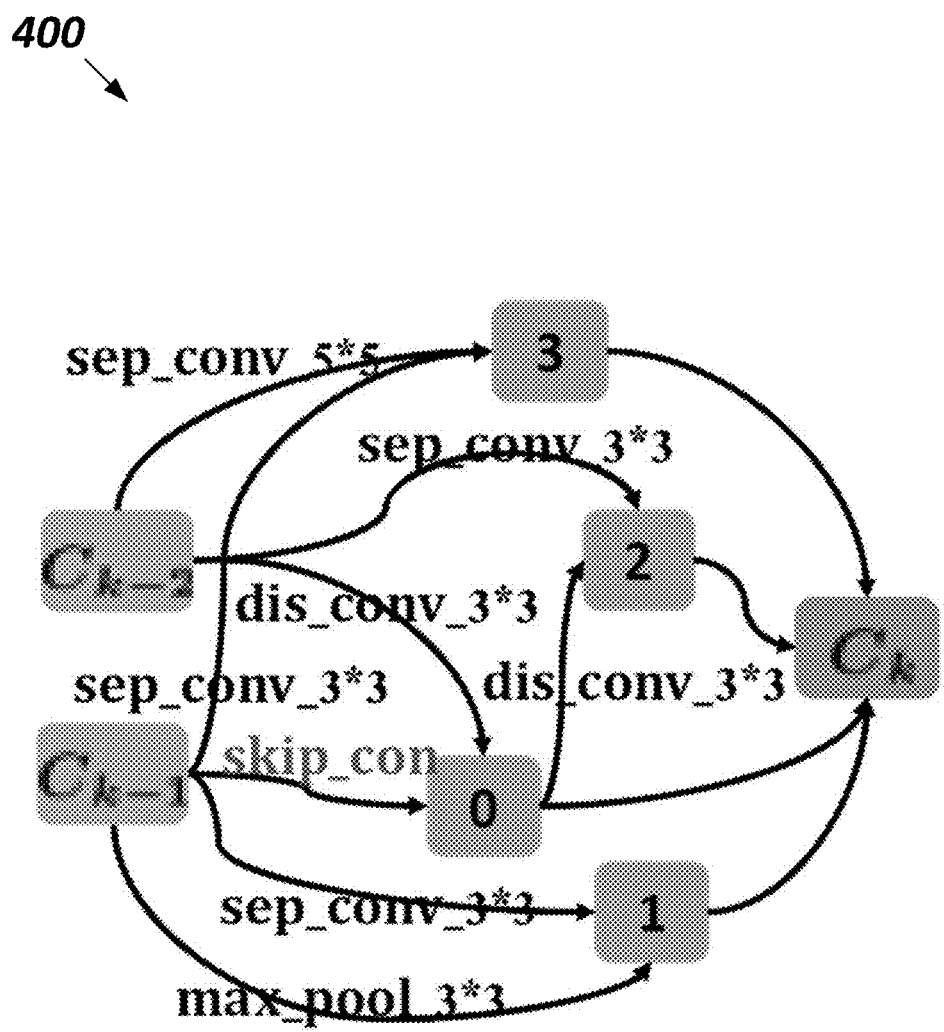
FIG. 4 is a diagram illustrating selected cells of a neural network using path-regularized DARTS (PR-DARTS) with sparse gates but without path regularizer according to some embodiments.
Figure 5:
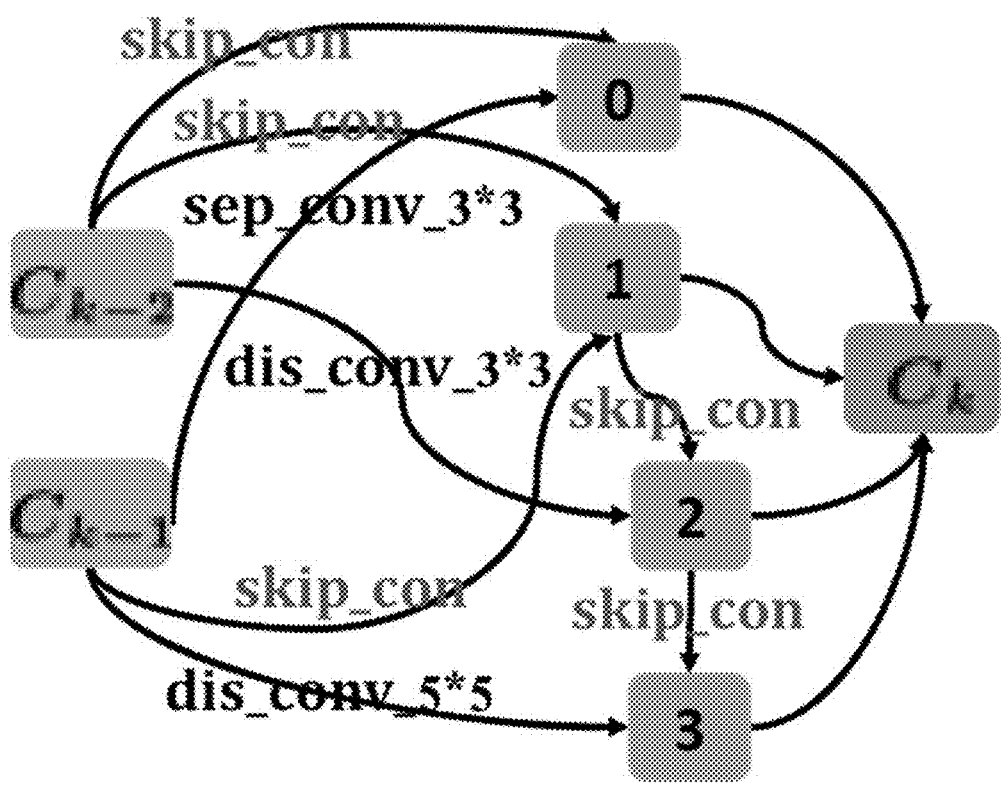
FIG. 5 is a diagram illustrating selected cells of a neural network using PR-DARTS without sparse gates but with path regularizer according to some embodiments.
Figure 6:
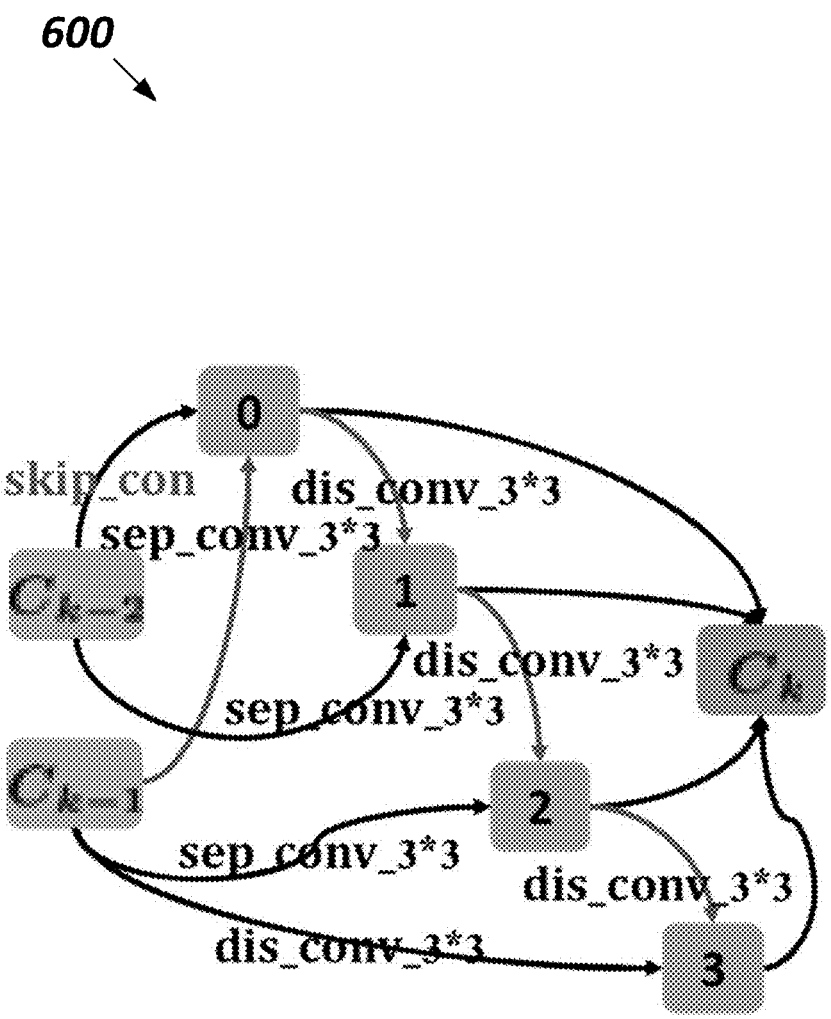
FIG. 6 is a diagram illustrating selected cells of a neural network using PR-DARTS with both sparse gates and path regularizer according to some embodiments according to some embodiments.
Figure 7:
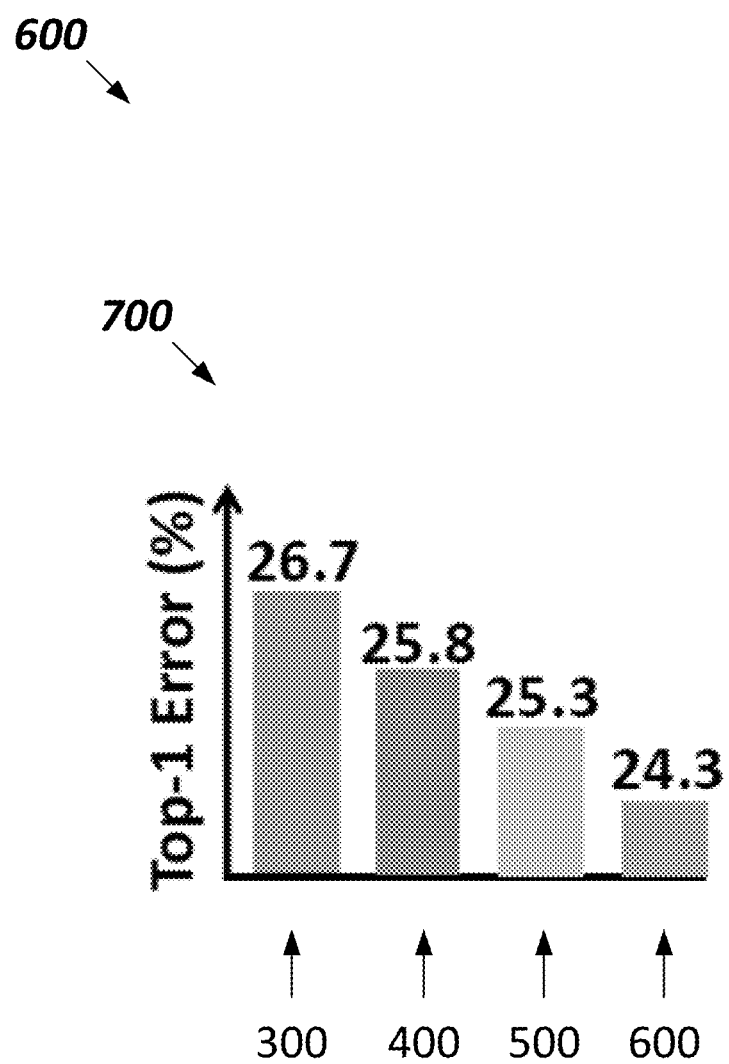
FIG. 7 is a diagram illustrating performance comparison of neural networks 300, 400, 500, and 600 of FIGS. 3-6 according to some embodiments according to some embodiments.

To address the performance issues based on the analysis results above, referring to FIGS. 2-8, systems and methods for improved DARTS based on the analysis results are described. FIG. 2 describes a method for performing improved DARTS, including path-regularized DARTS (PR-DARTS). FIGS. 3, 4, 5, and 6 are diagrams illustrating neural networks determined using various embodiments, and FIG. 7 illustrates the performance comparison of these neural networks of FIGS. 3-6. For example, FIG. 3 illustrates selected cells of a neural network using non-path-regularized DARTS according to some embodiments. FIG. 4 is a diagram illustrating selected cells of a neural network using PR-DARTS with sparse gates but without path regularizer according to some embodiments. FIG. 5 is a diagram illustrating selected cells of a neural network using PR-DARTS without sparse gates but with path regularizer according to some embodiments. FIG. 6 is a diagram illustrating selected cells of a neural network using PR-DARTS with both sparse gates and path regularizer according to some embodiments.

Various benefits are introduced by using the improved DARTS. For example, PR-DARTS introduces differential group-structured sparse binary gate for each operation to avoid unfair competition among operations, and thereby alleviating unfair competition between skip connection and other types of operations in DARTS. In some embodiments, a group-structured sparse binary gate implemented by Bernoulli distribution for each operation is defined. These gates independently determine whether their corresponding operations are used in the graph. All operations in the graph may be divided into a skip connection group and a non-skip connection group. The gates in these two groups may be independently regularizes to be sparse via a hard threshold function. This group-structured sparsity penalizes the skip connection group heavier than another group to rectify the competitive advantage of skip connections over other operations, and globally and gradually prunes unnecessary connections in the search phase to reduce the pruning information loss after searching.

For further example, a path-depth-wise regularization is developed to incite search exploration to deeper architectures, which often converge slower than shallower ones and are not well explored in the search phase. A path-depth-wise regularization may encourage large activation probability of gates along the long paths in the network graph, and thus incites more search exploration to deeper graphs. It is shown that gradient descent can faster optimize shallower and wider networks than deeper and thinner ones, and as such, this path-depth-wise regularization can rectify the competitive advantage of shallower network over deeper one. As such, PR-DARTS can search performance-oriented networks instead of fast-convergence-oriented networks and achieves better performance.

Referring to the example of FIG. 2, illustrated therein is a simplified diagram of a method 200 for performing PR-DARTS to providing a neural network model according to some embodiments. One or more of the processes 202-212 of method 200 may be implemented, at least in part, in the form of executable code stored on non-transitory, tangible, machine-readable media that when run by one or more processors may cause the one or more processors to perform one or more of the processes 202-212. In some embodiments, the method 200 may correspond to the method to determine neural network models used by neural network module 130 to perform training and/or perform inference using the neural network model for various tasks including for example image recognition and language modeling.

The method 200 begins at block 202, where a neural network is provided, where the neural network includes a plurality of cells, each cell corresponding to a graph including one or more nodes.

The method 200 proceeds to block 204, where a plurality of gates are provided, where each gate (e.g., a stochastic binary gate) is provided for each operation between two nodes, and the gate independently determines whether the corresponding operation is used.

As shown in the analysis results, typically, skip connection has superior competing advantages over other types of operations when they share one softmax distribution. By introducing independent stochastic gate for each operation between two nodes, the direct competition between skip connection and other operations is avoided.

Specifically, for example, define a stochastic binary gate $g_{s,t}^{(l)}$ for the t-th operation between nodes and $X^{(s)}$ and $X^{(l)}$, where $g_{s,t}^{(l)} \sim$ Bernoulli $\exp(\beta_{s,t}^{(l)})/(1+\exp(\beta_{s,t}^{(l)}))$. Then at each iteration, sample gate $g_{s,t}^{(l)}$ from its Bernoulli distribution and compute each node as $$X^{(l)} = \Sigma_{1 \le i < l} \Sigma_{t=1}^{r} g_{s,t}^{(l)} O_t(X^{(i)}).$$

Since the discrete sampling of $g_{s,t}^{(l)}$ is not differentiable, in some examples, Gumbel technique is used to approximate $g_{s,t}^{(l)}$ as $\bar{g}_{s,t}^{(l)} = \Theta((\ln \delta - \ln(1-\delta) + \beta_{s,t}^{(l)})/\tau)$ where $\Theta$ denotes sigmoid function, $\delta \sim$ Uniform (0, 1). For temperature $\tau$, when $\tau \to 0$ the approximated distribution $\bar{g}_{s,t}^{(l)}$ to the network parameter W.

If there is no regularization on the independent gates, then there are two issues. The first one is that the selected cells would have large weights for most operations. This is because (1) as shown in Theorem 1, increasing operation weights can lead to faster convergence rate; (2) increasing weights of any operations can strictly reduce or maintain the loss which is formally stated in Theorem 2. Let $t_{skip}$ and $t_{conv}$ respectively be the indexes of skip connection and convolution in the operation set $\mathcal{O}$.

Theorem 2. Assume the weights in DARTS model (2) is replaced with the independent gates $g_{s,t}^{(l)}$.

(1) Increasing the value of $g_{s,t}^{(l)}$ of the operations, including zero operation, skip operation, pooling and convolution with any kernel size, can reduce or maintain the loss $F_{val}(W^*(\beta), \beta)$ in (2).

(2) Suppose the assumptions in Theorem 1 hold. With probability at least $1-\delta$, increasing $g_{s,t_{skip}}^{(l)}$ ($0 \le s < l \le h-1$) of skip connection or $g_{s,t_{conv}}^{(h-1)}$ ($0 \le s < h-1$) of convolution with increment e can reduce the loss $F_{val}(W^*(\beta), \beta)$ in (2) to $F_{val}(W^*(\beta), \beta) - C\epsilon$ in expectation, where C is a positive constant.

Theorem 2 shows that, the first issue is that DARTS with independent gates would tune the weights of most operations large to obtain faster convergence and smaller loss, leading to dense cells and thus performance degradation when pruning these large weights. The second issue is that independent gates may not encourage benign competition and cooperation among operations, as Theorem 2 shows most operations tend to increase their weights. Considering the performance degradation caused by pruning dense cells, benign competition and cooperation among operations are needed for gradually pruning unnecessary operations to obtain relatively sparse selected cells.

As shown in FIG. 2, the method 200 may proceed to process 206, where group-structured sparsity regularization is imposed on the stochastic gates. As shown below, such a group-structured sparsity regularization addresses these two issues.

In some examples, stretch $\bar{g}_{s,t}^{(l)}$ from the range [0, 1] to [a, b] via rescaling $\tilde{g}_{s,t}^{(l)} = a + (b-a)\bar{g}_{s,t}^{(l)}$, where a<0 and b>1 are two constants. Then feed $\tilde{g}_{s,t}^{(l)}$ into a hard threshold gate to obtain the gate $g_{s,t}^{(l)} = \min(1, \max(0, \tilde{g}_{s,t}^{(l)}))$. In this way, the gate $g_{s,t}^{(l)}$ enjoys good properties, e.g. exact zero values and computable activation probability $\mathbb{P}(g_{s,t}^{(l)} \ne 0)$, which are formally stated in Theorem 3.

Theorem 3. For each stochastic gate $g_{s,t}^{(l)}$, it satisfies $g_{s,t}^{(l)} = 0$ when $$\tilde{g}_{s,t}^{(l)} \in \left(0, -\frac{a}{b-a}\right];$$

$g_{s,t}^{(l)} = \tilde{g}_{s,t}^{(l)}$ when $$\tilde{g}_{s,t}^{(l)} \in \left(0, -\frac{a}{b-a}, \frac{1-a}{b-a}\right];$$

$g_{s,t}^{(l)} = 1$ when $$\tilde{g}_{s,t}^{(l)} \in \left(\frac{1-a}{b-a}, 1\right].$$

Moreover, $$\mathbb{P}(g_{s,t}^{(l)} \ne 0) = \Theta\left(\beta_{s,t}^{(l)} - \tau \ln \frac{-a}{b}\right).$$

Theorem 3 shows that the gate $g_{s,t}^{(l)}$ can achieve exact zero, which can reduce information loss caused by pruning at the end of search. Next based on the activation probability $\mathbb{P}(g_{s,t}^{(l)} \ne 0)$ in Theorem 3, we design group-structured sparsity regularizations. We collect all skip connections in the cell as a skip-connection group and take the remaining operations into non-skip-connection group. The average activation probability of these two groups are computed as follows:

$$\mathcal{L}_{skip}(\beta) = \zeta \sum_{s=0}^{h-1} \sum_{s=0}^{l-1} \Theta\left(\beta^{(l)}_{s,t_{skip}} - \tau\ln\frac{-a}{b}\right),$$

$$\mathcal{L}_{non-skip}(\beta) = \frac{\zeta}{\gamma-1} \sum_{s=0}^{h-1} \sum_{s=0}^{l-1} \sum_{1 \le t \le r, t \ne t_{skip}} \Theta\left(\beta^{(l)}_{s,t} - \tau\ln\frac{-a}{b}\right),$$

where $$\zeta = \frac{2}{h(h-1)}.$$

Respectively regularize $\mathcal{L}_{skip}$ and $\mathcal{L}_{non-skip}$ by two different regularization constants $\lambda_1$ and $\lambda_2$ ($\lambda_1 > \lambda_2$ in experiments). This group-structured sparsity has three benefits: (1) penalizing skip connections heavier than other types of operations can rectify the competitive advantage of skip connections over other operations and avoids skip-connection-dominated cell; (2) sparsity regularizer gradually and automatically prunes redundancy and unnecessary connections which reduces the information loss of pruning at the end of search; (3) sparsity regularizer defined on the whole cell can encourage global competition and cooperation of all operations in the cell, which differs from DARTS that only introduces local competition among the operations between two nodes.

Figure 8:
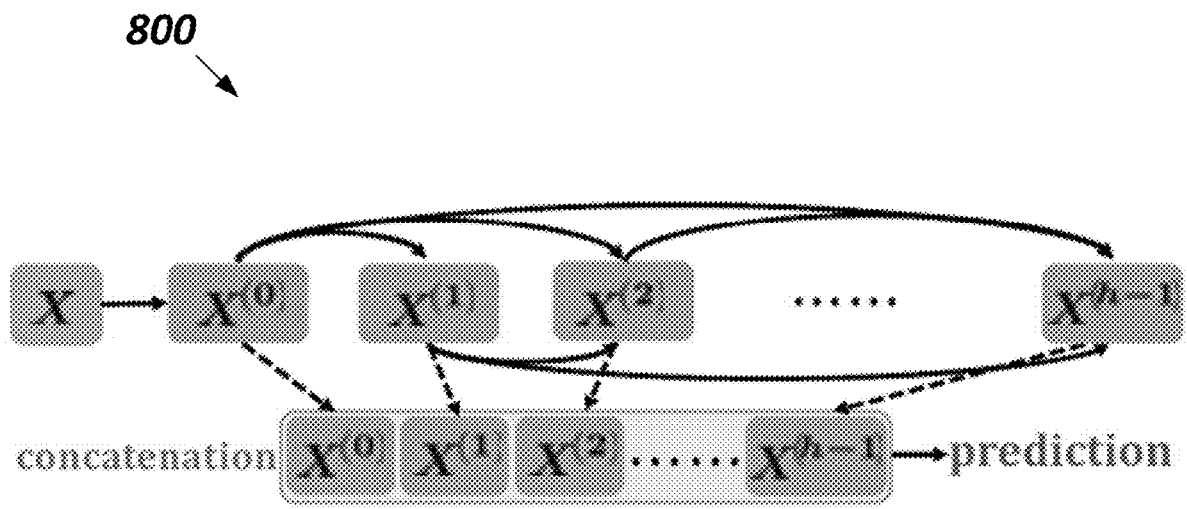
FIG. 8 is a diagram illustrating a deeper cell according to some embodiments.
Figure 9:
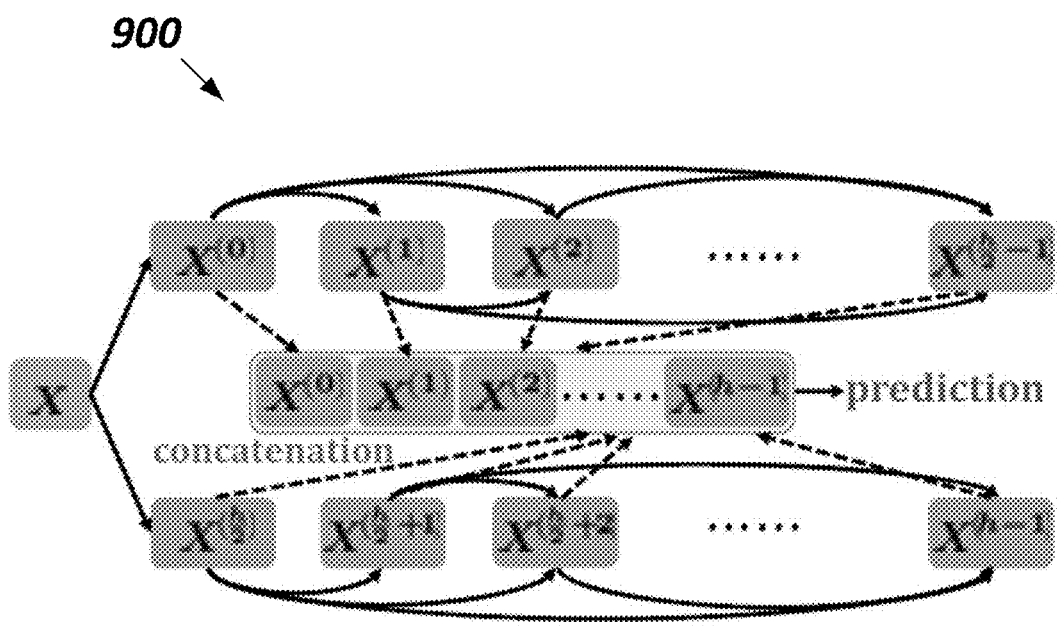
FIG. 9 is a diagram illustrating a shallower cell according to some embodiments.

The method 200 may proceed to block 208, where a path-depth-wise regularization on the stochastic gates is performed, for example, to rectify unfair competition between shallower and deeper cells. An example of a deeper cell 800 is shown in FIG. 8, and an example of a shallower cell 900 is shown in FIG. 9.

In various examples, independent sparse gates may introduce one issue: they prohibit the method to select deeper cells. Without dominated skip connections in the cell, other types of operations, e.g. zero operation, become freer and are widely used. Accordingly, the search algorithm can easily transform a deeper cell (e.g. deeper cell 800 of FIG. 8), to a shallower cell (e.g., shallower cell 900 of FIG. 9) whose intermediate nodes connect with input nodes via skip connections and whose intermediate neighboring nodes are not connected via zero operations. Meanwhile, gradient descent algorithm prefers shallower cells than deeper ones, as shallower cells often have more smooth landscapes and can be faster optimized. So these two factors together lead to a bias of search algorithm to shallower cells. Below is a proof of the faster convergence of shallower cells. Suppose $X^{(l)}$ (l=0, ..., h−1) are in two branches in FIG. 9: nodes $X^{(0)}$ to $$X^{\left(\frac{h}{2}-1\right)}$$

are in one branch with input X and they are connected via (7), and $$X^{(l)}\left(l = \frac{h}{2}, \ldots, h-1\right)$$

are in another branch with input X and connection (7). Next use all intermediate nodes to obtain a squared loss in (5). As shown in Theorem 4 below, the shallower cell B 900 in FIG. 9 enjoys much faster convergence than the deeper cell A 800 in FIG. 8. Note for cell B of FIG. 9, when its node $X^{(h/2)}$ connects with node $X^{(l)}$ (l<h/2−1), we have very similar results.

Theorem 4. Suppose the assumptions in Theorem 1 hold and for each $g_{s,t}^{(l)}$ (0≤s<l≤h−1) in deeper cell A, it has the same value in shallower cell B if it occurs in B. When optimizing W in $F_{train}(W, \beta)$ via gradient descent (6), both losses of cells A and B obey $F_{train}(W(k+1), \beta) \le (1-\eta\lambda'/4) F_{train}(W(k), \beta)$, where $\lambda'$ in A is defined as $$\lambda_A = \frac{3c_\sigma}{4} \lambda_{min}(K) \sum_{s=0}^{h-2} \left(g_{s,3}^{(h-1)}\right)^2 \prod_{t=0}^{s-1} \left(g_{t,2}^{(s)}\right)^2,$$

while $\lambda'$ in B becomes $\lambda_B$ and obeys $$\lambda_B \ge \lambda_A + \frac{3c_\sigma}{4} \lambda_{min}(K) \sum_{s=h/2}^{h-1} \left(g_{s,3}^{(h-1)}\right)^2 \prod_{t=h/2}^{s-1} \left(g_{t,2}^{(s)}\right)^2 > \lambda_A.$$

Theorem 4 shows that when using gradient descent to optimize the inner-level loss $F_{train}(W, \beta)$ equipped with independent gates, shallower cells can faster reduce the loss $F_{train}(W, \beta)$ than deeper cells. A training and validation data come from the same distribution which means $\mathbb{E}[F_{train}(W, \beta)] = \mathbb{E}[F_{val}(W, \beta)]$, shallower cells reduce $F_{val}(W, \beta)$ faster in expectation. So it is likely that to avoid deeper cells, search algorithm would connect intermediate nodes with input nodes and cut the connection between neighboring nodes via zero operation, which is indeed illustrated by FIG. 4. But it leads to cell-selection bias in the search phase, as some cells that fast decay the loss $F_{val}(W, \beta)$ at the current iteration have competitive advantage over other cells that reduce $F_{val}(W, \beta)$ slowly currently but can achieve superior final performance. This prohibits us to search good cells.

At block 208, a path-depth-wise regularization is performed to rectify the unfair competition between shallower and deeper cells. According to Theorem 3, the probability that $X^{(l)}$ and $X^{(l+1)}$ are connected by parameterized operations $O_p$, e.g. various types of convolutions, is $$\mathbb{P}_{l,l+1}(\beta) = \sum_{O_t \in O_p} \Theta\left(\beta^{(l+1)}_{l,t} - \tau\ln\frac{-a}{b}\right).$$

So the probability that all neighboring nodes $X^{(l)}$ and $X^{(l+1)}$ (l=0, ..., h−1) are connected via operations $O_p$, namely, the probability of the path of depth h, is $$\mathcal{L}_{path}(\beta) = \prod_{l=1}^{h-1} \mathbb{P}_{l,l+1}(\beta) = \prod_{l=1}^{h-1} \sum_{O_t \in O_p} \Theta\left(\beta^{(l+1)}_{l,t} - \tau\ln\frac{-a}{b}\right).$$

In some embodiments, skip connection, zero and pooling operations are not considered as they indeed make a network shallow. To rectify the competitive advantage of shallower cells over deeper ones, path-depth-wised regularization − $\mathcal{L}_{path}(\beta)$ is imposed on the stochastic gates to encourage more exploration to deeper cells and then decide the depth of cells instead of greedily choosing shallower cell at the beginning of search.

At block 210, optimization of the neural network including its network parameters and stochastic gate parameters is performed. The PR-DARTS model may be provided as follows:

$$\min_\beta F_{val}(W^*(\beta),\beta) + \lambda_1 \mathcal{L}_{skip}(\beta) + \lambda_2 \mathcal{L}_{non\text{-}skip}(\beta) - \lambda_3 \mathcal{L}_{path}(\beta), s.t.\ W^*(\beta) = \arg\min_W F_{train}(W,\beta),$$

where W denotes network parameters, β denotes the parameters for the stochastic gates. In some embodiments, parameters W and β are alternatively updated via gradient descent. After searching, redundancy connections are pruned, for example, according to the activation probability in Theorem 3 to obtain more compact cells.

At block 212, a task is performed using the optimized neural network.

Referring to FIGS. 3, 4, 5, and 6, performance of various embodiments are illustrated. Referring to FIG. 3, illustrated are selected cells of a neural network 300 using non-path-regularized DARTS according to some embodiments. As shown in FIG. 3, without path regulation (e.g., without either sparse gates of block 206 or path regularizer of block 208 of FIG. 2), during the search phase of DARTS, skip connection is more preferred in the search phase, over other types of operations (e.g., convolution and zero operation), and therefore it tends to search favor skip-connection dominated networks as shown in FIG. 3 (e.g., including 5 skip-connection operations in the network shown in FIG. 3).

Referring to the example of FIG. 4, a diagram illustrates selected cells of a neural network 400 using PR-DARTS with sparse gates (e.g., block 206 of FIG. 2) but without path regularizer (e.g., without block 208 of FIG. 2) is illustrated. By providing a group-structured sparse binary gate implemented by Bernoulli distribution for each operation, gates independently determine whether their corresponding operations are used in the graph. Further, all operations in the graph into skip connection group and non-skip connection group, and the gates in these two groups to are independently regularized be sparse via a hard threshold function. This group-structured sparsity penalizes the skip connection group heavier than another group to rectify the competitive advantage of skip connections over other operations, which is shown in FIG. 4 (e.g., including only one skip-connection). Further, the PR-DART globally and gradually prunes unnecessary connections in the search phase to reduce the pruning information loss after searching.

Referring to the example of FIG. 5, a diagram illustrates selected cells of a neural network 500 using PR-DARTS without sparse gates (e.g., without block 206 of FIG. 2) but with path regularizer (e.g., with block 208 of FIG. 2) according to some embodiments. The path-depth-wise regularization encourages large activation probability of gates along the long paths in the network graph, and thus incites more search exploration to deeper graphs (e.g., a path including more cells) illustrated by FIG. 5. Because gradient descent can faster optimize shallower and wider networks than deeper and thinner ones, this path-depth-wise regularization can rectify the competitive advantage of shallower network (e.g., including shallower/shorter paths having fewer cells) over deeper one (e.g., including deeper/longer paths having more cells).

FIG. 6 is a diagram illustrating selected cells of a neural network 600 using PR-DARTS with both sparse gates (e.g., with block 206 of FIG. 2) and path regularizer (e.g., with block 208 of FIG. 2) according to some embodiments. By using both sparse gates and path regularizer, the performance is PR-DART is further improved by both rectifying the competitive advantage of skip connections over other operations and encourages large activation probability of gates along the long paths in the network graph.

Referring to FIG. 7, performance comparison of neural networks 300-600 (e.g., testing using ImageNet) of FIGS. 3-6 are illustrated. As shown in FIG. 7, neural network 600 has the best performance with the lowest top-1 error (e.g., 24.3%), which is better than neural network 300 (with a top-1 error of 26.7%), neural network 400 (with a top-1 error of 25.8%), and neural network 500 (with a top-1 error of 25.3%). As such, the PR-DARTS methods and systems may achieve better performance by searching performance-oriented networks instead of fast-convergence-oriented networks.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method/system 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for providing a multi-layer neural network, comprising:
   initializing the multi-layer neural network including a plurality of cells, each cell corresponding to a graph including a plurality of nodes, each node corresponding to a latent representation of a dataset;
   generating a plurality of gates for a first cell, wherein each gate independently determines whether an operation between two nodes in the first cell is used, wherein the first cell includes:
      two input nodes corresponding to outputs of two previous cells respectively,
      one or more intermediate nodes connecting with previous nodes in the cell, and
      an output node provided by concatenating the one or more intermediate nodes;
   performing a first regularization using the plurality of gates, wherein the first regularization includes a group-structured sparsity regularization and a path-depth-wise regularization,
   wherein the group-structured sparsity regularization includes:
      assigning a first regularization constant to a skip connection group; and
      assigning a second regularization constant to a non-skip connection group;
      wherein the first regularization constant is larger than the second regularization constant; and
      wherein the path-depth-wise regularization is configured for correcting cell-selection bias caused by the plurality of gates in group-structured sparsity regularization, wherein the cell-selection bias is generated after intermediate nodes are connected with input nodes in the multi-layer neural network; and
   performing an optimization on the multi-layer neural network by adjusting its network parameters and gate parameters based on the first regularization using the first regularization constant and the second regularization constant.

2. The method of claim 1, wherein the performing the group-structured sparsity regularization includes:
   generating two or more groups from the plurality of gates based on a corresponding operation type of each gate; and
   performing a regularization of sparsity of each of the two or more groups.

3. The method of claim 2, wherein the performing the group-structured sparsity regularization includes:
   generating a first group loss based on activation probability of a first group of the two or more groups; and
   generating a second group loss based on activation probability of a second group of the two or more groups;
   wherein the optimization is performed based on the first group loss and the second group loss.

4. The method of claim 1, wherein the performing the path-depth-wise regularization includes:
   generating a path-depth-wise loss using probabilities based on a depth of a path of the multi-layer neural network;
   wherein the optimization is performed based on the path-depth-wise loss.

5. The method of claim 1, wherein the operation is one of skip connection, zero operation, and pooling operation, separable convolutions, dilated separable convolutions, average pooling and max pooling.

6. The method of claim 1, wherein the optimization uses gradient descent.

7. A non-transitory machine-readable medium comprising a plurality of machine-readable instructions which, when executed by one or more processors, are adapted to cause the one or more processors to perform a method comprising:
   initializing a multi-layer neural network including a plurality of cells, each cell corresponding to a graph including a plurality of nodes, each node corresponding to a latent representation of a dataset;
   generating a plurality of gates for a first cell, wherein each gate independently determines whether an operation between two nodes in the first cell is used, wherein the first cell includes:
      two input nodes corresponding to outputs of two previous cells respectively,
      one or more intermediate nodes connecting with previous nodes in the cell, and
      an output node provided by concatenating the one or more intermediate nodes;
   performing a first regularization using the plurality of gates, wherein the first regularization includes a group-structured sparsity regularization and a path-depth-wise regularization,
   wherein performing the group-structured sparsity regularization includes:
      assigning a first regularization constant to a skip connection group; and
      assigning a second regularization constant to a non-skip connection group;
      wherein the first regularization constant is larger than the second regularization constant; and
      wherein the path-depth-wise regularization is configured for correcting cell-selection bias caused by the plurality of gates in group-structured sparsity regularization, wherein the cell-selection bias is generated after intermediate nodes are connected with input nodes in the multi-layer neural network via skip connections and after connections between neighboring nodes are cut via zero operation; and
   performing an optimization on the multi-layer neural network by adjusting its network parameters and gate parameters based on the first regularization using the first regularization constant and the second regularization constant.

8. The non-transitory machine-readable medium of claim 7, wherein the performing the group-structured sparsity regularization includes:
   generating two or more groups from the plurality of gates based on a corresponding operation type of each gate; and
   performing a regularization of sparsity of each of the two or more groups.

9. The non-transitory machine-readable medium of claim 8, wherein the performing the group-structured sparsity regularization includes:
   generating a first group loss based on activation probability of a first group of the two or more groups; and
   generating a second group loss based on activation probability of a second group of the two or more groups;
   wherein the optimization is performed based on the first group loss and the second group loss.

10. The non-transitory machine-readable medium of claim 7, wherein the performing the path-depth-wise regularization includes:

generating a path-depth-wise loss using probabilities based on a depth of a path of the multi-layer neural network;
wherein the optimization is performed based on the path-depth-wise loss.

11. The non-transitory machine-readable medium of claim 7, wherein the operation is one of skip connection, zero operation, and pooling operation, separable convolutions, dilated separable convolutions, average pooling and max pooling.

12. The non-transitory machine-readable medium of claim 7, wherein the optimization uses gradient descent.

13. A system, comprising:
a non-transitory memory; and
one or more hardware processors coupled to the non-transitory memory and configured to read instructions from the non-transitory memory to cause the system to perform a method comprising:
initializing a multi-layer neural network including a plurality of cells, each cell corresponding to a graph including a plurality of nodes, each node corresponding to a latent representation of a dataset;
generating a plurality of gates for a first cell, wherein each gate independently determines whether an operation between two nodes in the first cell is used, wherein the first cell includes:
two input nodes corresponding to outputs of two previous cells respectively,
one or more intermediate nodes connecting with previous nodes in the cell, and
an output node provided by concatenating the one or more intermediate nodes;
performing a first regularization using the plurality of gates, wherein the first regularization includes a group-structured sparsity regularization and a path-depth-wise regularization,
wherein performing the group-structured sparsity regularization includes:
assigning a first regularization constant to a skip connection group; and
assigning a second regularization constant to a non-skip connection group;
wherein the first regularization constant is larger than the second regularization constant; and
wherein the path-depth-wise regularization is configured for correcting cell-selection bias caused by the plurality of gates in group-structured sparsity regularization, wherein the cell-selection bias is generated after intermediate nodes are connected with input nodes in the multi-layer neural network via skip connections and after connections between neighboring nodes are cut via zero operation; and
performing an optimization on the multi-layer neural network by adjusting its network parameters and gate parameters based on the first regularization using the first regularization constant and the second regularization constant.

14. The system of claim 13, wherein the performing the group-structured sparsity regularization includes:
generating two or more groups from the plurality of gates based on a corresponding operation type of each gate; and
performing a regularization of sparsity of each of the two or more groups.

15. The system of claim 14, wherein the performing the group-structured sparsity regularization includes:
generating a first group loss based on activation probability of a first group of the two or more groups; and
generating a second group loss based on activation probability of a second group of the two or more groups;
wherein the optimization is performed based on the first group loss and the second group loss.

16. The system of claim 13, wherein the performing the path-depth-wise regularization includes:
generating a path-depth-wise loss using probabilities based on a depth of a path of the multi-layer neural network;
wherein the optimization is performed based on the path-depth-wise loss.

17. The system of claim 13, wherein the operation is one of skip connection, zero operation, and pooling operation, separable convolutions, dilated separable convolutions, average pooling and max pooling.

* * * * *